United States Patent [19]

Ward et al.

[11] Patent Number: 4,725,457
[45] Date of Patent: Feb. 16, 1988

[54] RESINOUS COMPOSITIONS AND THEIR FORMULATION INTO INTUMESCENT FIRE PROTECTIVE COMPOSITIONS

[75] Inventors: Thomas A. Ward, Gibsonia; Karl F. Schimmel, Verona; Lois C. Trautvetter, Pittsburgh; Robert W. Heber, Bethel Park; John P. Mikus, Springdale; Jerome A. Seiner, Pittsburgh, all of Pa.

[73] Assignee: PPG Industries, Inc., Pittsburgh, Pa.

[21] Appl. No.: 894,168

[22] Filed: Aug. 7, 1986

[51] Int. Cl.$^4$ .............................................. C08G 18/40
[52] U.S. Cl. ........................... 427/385.5; 427/386; 428/423.1; 524/405; 524/414; 524/432; 525/417; 525/424; 525/427; 525/428; 528/48; 528/49; 528/73; 528/75; 528/28; 528/44; 528/266; 528/269
[58] Field of Search ............... 524/405, 414, 432; 525/417, 424, 427, 428; 427/385.5, 386; 428/423.1; 528/48, 49, 73, 75, 28, 44, 266, 269

[56] References Cited

U.S. PATENT DOCUMENTS

| 3,755,223 | 8/1973 | Engel | 260/18 PN |
|---|---|---|---|
| 4,111,885 | 9/1978 | Abu-Isa | 524/432 |
| 4,188,313 | 2/1980 | Cerny et al. | 524/432 |
| 4,252,703 | 2/1981 | Patzschke et al. | 260/29.2 |
| 4,414,250 | 11/1983 | Costanza et al. | 427/386 |
| 4,477,530 | 10/1984 | Diefenbach et al. | 428/413 |
| 4,529,467 | 7/1985 | Ward et al. | 156/307 |
| 4,529,742 | 7/1985 | Von Bonin et al. | 528/73 |
| 4,548,972 | 10/1985 | Williams | 524/405 |

FOREIGN PATENT DOCUMENTS

| 1280543 | 7/1972 | United Kingdom . |
|---|---|---|
| 1575708 | 9/1980 | United Kingdom . |
| 2071111A | 9/1981 | United Kingdom . |
| 2121056A | 12/1983 | United Kingdom . |

OTHER PUBLICATIONS

Beilsteins Handbuch der Organischen Chemie, Gesamtregister für das Hauptwerk und die Ergänzungswerke I, II, III, und IV, Formelregister für Band 4, p. 148, Springer–Verlag, Berlin, 1984.

Primary Examiner—Maurice J. Welsh
Assistant Examiner—Sam A. Acquah
Attorney, Agent, or Firm—Linda Pingitore

[57] ABSTRACT

A resinous composition is composed of the ungelled reaction product of
 (i) a diester of oxalic acid;
 (ii) a material containing one or more primary and/or secondary amino groups and one or more additional functional groups; and
 (iii) a material capable of coreacting with (i) or (ii).

The resinous composition is useful in formulating intumescent fire protective compositions for fire protection of substrates.

34 Claims, No Drawings

RESINOUS COMPOSITIONS AND THEIR FORMULATION INTO INTUMESCENT FIRE PROTECTIVE COMPOSITIONS

BACKGROUND OF THE INVENTION

The present invention relates to fire protective intumescent compositions. In recent years, the effectiveness of fire protective compositions has steadily improved with the emergence and rapid gain in the popularity of intumescent fire protective coating compositions. An intumescent coating composition is one which will expand to form an insulating, cellular carbonaceous char structure upon exposure to sufficient heat. There are a variety of fire protective intumescent compositions which are available and all provide varying degrees of fire protection. In some circumstances, however, a degree of fire protection is desirable which is not met by the available compositions. There is a need, therefore, for an intumescent fire protective coating composition which can provide an increased measure of fire protection.

SUMMARY OF THE INVENTION

In accordance with the present invention there is provided a resinous composition comprising the ungelled reaction product of:
(i) a diester of oxalic acid;
(ii) a material containing one or more primary and/or secondary amino groups and one or more additional functional groups; and
(iii) a material capable of coreacting with (i) or (ii).

Also provided is an intumescent, fire protective composition comprising a source of phosphorous and the resinous composition detailed above. This intumescent composition is capable of forming a carbonaceous char upon exposure to heat or flame.

In addition there is provided a method of reducing the rate of temperature rise in a substrate when it is subjected to fire conditions, which comprises applying to the surface of the substrate a fire protective composition, which when exposed to fire conditions, intumesces. The intumescent composition is characterized in that it comprises a source of phosphorus and the resinous composition which has been detailed above.

Also provided by the present invention is a substrate which demonstrates a reduced rate of temperature rise when it is subjected to fire conditions. The substrate is characterized by having applied on its surface the intumescent composition which has been detailed above. The carbonaceous char which forms when the intumescent composition is exposed to fire conditions is capable of retaining its integral structure and adhering to the substrate without external reinforcement.

DETAILED DESCRIPTION OF THE INVENTION

The resinous composition of the present invention comprises the ungelled reaction product of three principal constituents. The first of these is a diester of oxalic acid which can be represented by the formula shown below:

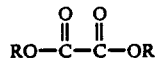

wherein R can be chosen from aliphatic, cycloaliphatic or aromatic substituents. Exemplary of such suitable diesters include diethyl oxalate, dibutyl oxalate, diphenyl oxalate, dibenzyl oxalate and dicyclohexyl oxalate. Preferably, the diester of oxalic acid is selected from diethyl oxalate and dibutyl oxalate.

Another constituent which is utilized in the preparation of the ungelled reaction product is a material containing one or more primary and/or secondary amino groups and one or more additional functional groups. This amino group-containing material can be monomeric or polymeric. Some examples of monomeric materials are 5-hydroxy-3-oxa-pentylamine commercially available from Jefferson Chemicals under the registered trademark DIGLYCOLAMINE ®; ethanolamine; aminobenzoic acid; aminocyclohexanol; aminocyclohexane carboxylic acid; aminocaprolactone; aminocresol; aminobutanol; aminopropyltriethoxysilane; aminocaprylic acid and aminobutyric acid. Some examples of polymeric materials include polyamines such as the liquid diamine which is commercially available from Henkel Company under the trademark designation VERSAMINE A-52; polyethylene imines such as those commercially available from Dow Chemical Company under the trademark designation PEI; polyalkyl polyamines such as di(hexamethylene)triamine; poly(amide-amines) such as VERSAMID 125 which is commercially available from Henkel Company; and phenolic polyamines such as VERSAMINE F-20 which is also commercially available from Henkel Company.

In one preferred embodiment, the monomeric material commercially available under the trademark DIGLYCOLAMINE ® is utilized.

As was stated above, the material containing one or more primary and/or secondary amino groups also contains one or more different functional groups. These functional groups include hydroxyl, carboxyl, thiol, epoxy, alkoxysilane, and tertiary amino. Although not generally referred to as functional groups, easily aminated ester groups such as alpha-keto esters and vinyl unsaturation can also be present on the amino group-containing material. For ease of discussion, easily aminated ester groups and vinyl unsaturation are referred to herein as functional groups. Preferably, the material containing primary and/or secondary amino groups contains hydroxyl functionality as the functional group or groups.

In addition to the materials listed above among the monomeric amino group containing materials, examples of materials containing one or more primary and/or secondary amino groups and one or more different functional groups include amino acids such as alanine; mercaptoethylamine; t-butyl aminoethyl methacrylate; an epoxy containing hydrazide such as that formed from an epoxidized oil and hydrazine, or that formed from a cycloaliphatic epoxy ester such as epoxycyclohexylmethyl epoxycyclohexane and hydrazine.

Another constituent in the preparation of the ungelled reaction product is a material which is capable of coreacting with either of constituents (i) or (ii) which have been detailed above. That is, this material is capable of reacting with the diester of oxalic acid or with the material containing one or more primary and/or secondary amino groups and one or more additional functional groups. With respect to the second constituent, the coreactive material contains functionality which is capable of reacting either with the amine functionality on the amino group containing material or with the additional functional groups which are present on it. In a preferred embodiment, the material capable of co-reacting with (i) or (ii) contains functionality which is coreactive with the one or more different functional groups which are present on the amino group containing material, (ii).

In a preferred embodiment of the present invention the resinous composition comprises the ungelled reaction product of:

(a) an ungelled composition comprising the half-amide reaction product of a diester of oxalic acid and a material containing one or more primary and/or secondary amino groups and one or more different functional groups;

(b) a material containing functional groups capable of coreacting with the ungelled composition of (a).

Preferably, the functional groups of the material of (b) are capable of coreacting with the different functional groups present on the amino group-containing material of (a).

The ungelled composition comprising the half-amide reaction product is generally prepared by combining and heating the reactants at a temperature below about 30° C. Typically an inert solvent such as ethyl alcohol or xylene is utilized although if desired, the reaction can be performed without the presence of solvent. The completion of the reaction is monitored by gel permeation chromatography and is evidenced by the essentially complete disappearance of low molecular weight starting materials.

Exemplary of materials representative of the material (b) capable of coreacting with the ungelled composition of (a) include polyisocyanates; and condensation products obtained from the reaction of alcohols and formaldehyde with melamine, urea or benzoguanamine. These condensation products can be monomeric or polymeric. Condensation products of other amines and amides can also be employed, for example, aldehyde condensates of triazines, diazines, triaoles, guanadines, guanamines and alkyl- and aryl-substituted derivatives of such compounds, including alkyl- and aryl-substituted ureas and alkyl- and aryl-substituted melamines. Some examles of such compounds are N,N'-dimethyl urea, benzourea, dicyandimide, formaguanamine, acetoguanamine, glycoluril, ammelin 2-chloro-4,6-diamino-1,3,5-triazine, 6-methyl-2,4,diamine-1,3,5-triazine, 3,5-diamino-triazole, triaminopyrimidine, 2-mercapto-4,6-diamino-pyrimidine, 3,4,6-tris(ethylamino)-1,3,5-triazine, and the like.

While the aldehyde employed is most often formaldehyde, other similar condensation products can be made from other aldehydes, such as acetaldehyde, crotonaldehyde, acrolein, benzaldehyde, furfural, glyoxal and the like.

These condensation products contain methylol or similar alkylol groups, and in most instances at least a portion of these alkylol groups are etherified by a reaction with an alcohol. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohol such as cyclohexanol, monoethers, of glycols such as CELLOSOLVES and CARBITOLS, and halogen-substituted or other substituted alcohols, such as 3-chloro-propanol and butoxyethanol. The preferred condensation products are substantially alkylated with methanol or butanol.

The polyisocyanate can be an aliphatic or an aromatic isocyanate or a mixture of the two. Also, higher polyisocyanates are preferred although diisocyanates and monoisocyanates can be used in place of or in combination with the higher polyisocyanates. Examples of suitable monoisocyanates are butyl isocyanate, cyclohexyl isocyanate, phenyl isocyanate and toluene isocyanate. Examples of suitable aromatic diisocyanates are 4,4'-diisocyanate, 1,3-phenylene diisocyanate, 1,4-phenylene diisocyanate and toluene diisocyanate. Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include 1,4-cyclohexyl diisocyanate, isophorone diisocyanate, and 4,4'-ethylene-bis-(cyclohexyl isocyanate). Examples of suitable higher polyisocyanates are 1,2,4-benzene triisocyanate, polymethylene polyphenyl isocyanate, and isocyanurates and biurets of the diisocyanates described above.

The present invention is also directed to an intumescent, fire protective composition which comprises a source of phosphorus and the resinous composition which has been described in detail above.

The source of phosphorus can be selected from a variety of materials such as, for example, phosphoric acid, mono- and di-ammonium phosphate, tris-(2-chloroethyl) phosphate, phosphorus-containing amides such as phosphorylamide, and melamine pyrophosphate. Preferably the source of phosphorous is an ammonium polyphosphate represented by the formula:

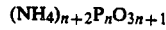

$(NH_4)_{n+2}P_nO_{3n+1}$ wherein n is an integer of at least 2, preferably n is an integer of at least 50. Examples of such materials are those commercially available under the trademark designations PHOS-CHEK-P-30 from Monsanto Corporation, AMGAD MC from Albright and Wilson Corporation, and EXOLIT 422 from American Hoechst. Preferably, PHOS-CHEK-P-30 is utilized herein. The claimed intumescent composition typically contains an amount of phosphorus which ranges from about 0.05 percent to about 20 percent by weight, preferably 0.50 to 10 percent by weight, the percentages being based upon the total wieght of the composition. The phosphorus is believed to function as a char promoter in the intumescent composition.

In one preferred embodiment of the present invention the resinous composition which is utilized in the preparation of the intumescent fire protective composition additionally comprises one or more resinous materials which are different from the ungelled reaction product which has been detailed above. Examples of suitable materials include epoxide resins; melamine-formadehyde condensates such as those commercially available from American Cyanamid under the trademark designation CYMEL; acrylic resins; polyester resins; polyurethane resins; oils such as linseed oil or soya oil; and bodied oils.

In addition, the intumescent fire protective composition preferably contains a curing agent which is adapted to cure the resinous composition which has been detailed above. It should be understood, however, that in some embodiments a curing agent is not required and the intumescent composition can cure oxidatively, for example when there are present oils or bodied oils in the composition. Also, the composition can be cured by moisture such as when there are present polyurethane moieties; or by free radical initiated vinyl addition polymerization such as when there are vinyl monomers present in the composition.

The melamine-formadehyde condensates which are suitable for use herein have been detailed above and will not be discussed further here.

Polyesters are of two kinds, saturated polyesters and unsaturated polyesters derived from unsaturated polyfunctional acids and polyhydric alcohols. These polyesters are essentially linear in structure. Maleic acid and fumaric acid are the usual unsaturated acid components. Commonly used polyhydric alcohols are ethylene glycol, propylene glycol, diethylene glycol, dipropylene glycol, butylene glycol, glycerol, trimethylolpropane, pentaerythritol and sorbitol. Often a saturated acid will be included in the reaction to provide desirable properties. Examples of saturated acids include adipic acid, azelaic acid and sebacic acid and the anhydrides thereof where they exist. The saturated polyesters are derived from saturated or aromatic polyfunctional acids, preferably dicarboxylic acids, and mixtures of polyhydric alcohols having an average hydroxyl functionality greater than 2.

Useful acrylic resins are the polymerized ester derivatives of acrylic acid and methacrylic acid. The esters are formed by the reaction of acrylic or methacrylic acid with suitable alcohols, e.g., methyl alcohol, ethyl alcohol, propyl alcohol, butyl alcohol and 2-ethylhexyl alcohol. Monomers such as styrene, vinyl toluene, vinyl chloride and vinylidine chloride also may be reacted with the acrylic and methacrylic esters.

Polyurethane resins are synthetic polymers that may be either thermoplastic or thermosetting. The basic polymeric unit is RNHCOOR. The R groups can be the same or different and can contain other reactive groups, for example, a second —NCO group, a second —OH group, etc. Typically, a polyhydric alcohol is reacted with a polyisocyanate to produce the urethane resin. Useful polyhydric alcohols include ethylene glycol, propylene glycol, butylene glycol, glycerol, trimethylolpropane and hexane triol. Many variations are possible.

The epoxy resins, which are suitable herein are these which contain at least one oxirane group, i.e.,

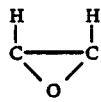

in the molecule. Hydroxyl substituent groups can also be present and frequently are, as well as halogen and ether groups. Generally, the epoxide equivalent weight ranges from about 140 to about 1780, preferably 170 to 250, more preferably from 185 to 195 and the resins can be broadly categorized as being aliphatic, aromatic, cyclic, acyclic, alicyclic or heterocyclic. Preferably aromatic epoxide resins are used herein.

One particularly preferred group of aromatic epoxy resins are the polyglycidyl ethers of polyhydric aromatic alcohols, such as, for example, dihydric phenols. The phenol must be at least dihydric and suitable examples include resorcinol, catechol, hydroquinone, bis(4-hydroxyphenyl)-1,1-isobutane; 4,4-dihydroxybenzophenone; bis(4-hydroxyphenyl)-1,1-ethane; bis(2-hydroxynaphenyl)methane; 1,5-hydroxynaphthalene and 4,4'-isopropylidenediphenol, i.e., bisphenol A. Preferably bisphenol A is utilized. Of the many epoxy compounds possible, the one principally utilized is epichlorohydrin although epibromohydrin is also quite useful. The polyglycidyl ethers especially useful herein are obtained by reacting epichlorohydrin and bisphenol A in the presence of an alkali such as sodium or potassium hydroxide. The series of epoxy resins sold by Shell Chemical Company under the trademark EPON are especially useful herein.

Another group of useful epoxy resins are the polyglycidyl ethers derived from such polyhydric alcohols as ethylene glycol; diethylene glycol; triethylene glycol; 1,2-propylene glycol; 1,4-butylene glycol; 1,5-pentanediol; 1,2,6-hexanetriol; glycerol and trimethylolpropane.

Also useful are the epoxide resins which are polyglycidyl ethers of polycarboxylic acids. These materials are produced by the reaction of an epoxy compound such as epichlorohydrin with an aliphatic or aromatic polycarboxylic acid such as oxalic acid; succinic acid; glutaric acid; terephthalic acid; 2,6-napthalene dicarboxylic acid and dimerized linoleic acid.

Still another group of epoxide resins are derived from the epoxidation of an olefinically unsaturated alicyclic material. Among these are the epoxy alicyclic ethers and esters well known in the art.

Besides the materials discussed above, useful epoxy resins also include those containing oxyalkylene groups, i.e.,

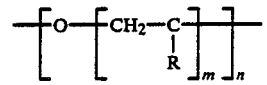

wherein R is hydrogen or $C_1$ to $C_6$ alkyl, m is an integer from 1 to 4 and n is an integer from 2 to 50. Such groups can be pendant from the backbone of the epoxide resin or they can be included as part of the backbone. The proportion of oxyalkylene groups in the epoxy resin depends upon a number of factors, among them, the size of the oxyalkylene group and the nature of the epoxy resin.

One additional class of epoxy resins encompasses the epoxy novolac resins. These resins are prepared by reacting an epihalohydrin with the condensation product of an aldehyde with a monohydric or polyhydric phenol. One example is the reaction product of epichlorohydrin with a phenol formaldehyde condensate. A mixture of epoxy resins can also be used herein.

The aforedescribed epoxy resins require the addition of a curing agent in order to convert them to thermoset materials. In the curing process, both the epoxy groups and the hydroxyl groups (if present) can participate and curing can take place either at ambient temperature or upon application of heat.

In general, the curing agents which can be utilized herein to cure the resinous component of the intumescent curable composition can be selected from a variety of conventionally known materials, for example, amine type, including aliphatic and aromatic amines, and poly(amine-amides). Examples of these include diethylene triamine; 3,3-amino bis propylamine; triethylene tetraamine; tetraethylene pentamine; m-xylylenediamine; and the reaction product of an amine and an aliphatic fatty acid such as the series of materials sold by Henkel under the trademark VERSAMID. Preferably the poly(amine-amide) materials such as VERSAMID or its equivalent are utilized.

Also suitable as curing agents are polycarboxylic acids and polycarboxylic acid anhydrides. Examples of polycarboxylic acids include di-, tri-, and higher carboxylic acids such as, for example, oxalic acid, phthalic acid, terephthalic acid, succinic acid, alkyl and alkenyl-substituted succinic acids, tartaric acid, and polymerized fatty acids. Examples of suitable polycarboxylic acid anhydrides include, among others, pyromellitic anhydride, trimellitic anhydride, phthalic anhydride, succinic anhydride, and maleic anhydride.

In addition, aldehyde condensation products such as urea-, melamine-, or phenol-formaldehyde are very useful curing agents. A variety of these materials are commercially available under several trademark designations, for example, BEETLE and CYMEL from American Cyanamid and RESIMENE from Monsanto Industrial Chemicals Company.

Other suitable curing agents include boron trihalide and complexes of boron trihalide with amines, ethers, phenols and the like; polymercaptans; polyphenols; metal salts such as aluminum chloride, zinc chloride and magnesium merchlorate, inorganic acids and partial esters such as phosphoric acid and n-butyl orthophosphite. It should be understood that blocked or latent curing agents can also be utilized if desired; for example, ketamines which are prepared from a polyamine and a ketone.

When an epoxy resin is present as a part of the resinous component, the amount of the epoxy resin and curing agent utilized can vary, but generally the equivalent ratio of epoxy to amine is within the range of from about 0.05:1 to about 10:1. Preferably, the epoxy to amine equivalent ratio is within the range of from 0.25:1 to 4:1 and more preferably within the range of 0.5:1 to 2:1.

The intumescent curable composition of the present invention also preferably comprises an additive component. In addition to the source of phosphorus which has been described above, the additive component of the claimed composition comprises a mixture of materials adapted to provide a source of zinc, boron, and expansion gas upon thermal decomposition. In a preferred embodiment the additive component additionally contains a reinforcing filler.

The expansion gas serves to cause the fire protective composition to foam and swell, i.e., intumesce, when exposed to high temperatures or flames. As a result of this expansion, the char which is formed is a thick, multi-celled material which serves to insulate and protect the underlying substrate. Preferably, the source of expansion gas is a nitrogen-containing material. Examples of suitable nitrogen-containing materials include melamine, methylolated melamine, hexamethoxymethyl melamine, urea, dimethylurea, melamine pyrophosphate, dicyandiamide, guanylurea phosphate and glycine. Preferably, melamine is utilized. Other conventional sources of expansion gas can also be used such as those materials which liberate carbon dioxide. The source of expansion gas is usually present in the compositions of the present invention in an amount ranging from about 0.1 to about 25 percent by weight, preferably 1 to 10 percent by weight, the percentages being based upon the total weight of the composition.

It should be understood that derivatives of oxalates can be sources of expansion gas upon thermal decomposition. Therefore, the resinous composition prepared from the half-amide reaction product of a diester of oxalic acid can be a source of expansion gas upon thermal decomposition.

The source of zinc can be selected from a variety of materials. It is believed that the zinc material contributes to the formation of a small-celled structure in the char. The small cells of the char afford better insulation for the substrate and are better able to retain the char's integrity and adhere to the substrate even in the absence of external reinforcing materials. Thus, cracking of the char and its breaking away from the substrate are minimized and a greater measure of protection is afforded to the underlying substrates. Examples of suitable materials which are sources of zinc include zinc oxide, zinc salts such as zinc borate and zinc phosphate; zinc carbonate; also zinc metal can be used. Preferably zinc oxide, zinc borate or zinc phosphate are utilized. Usually the claimed intumescent composition contains an amount of zinc which ranges from about 0.1 to about 25 percent by weight, preferably 0.5 to 12 percent by weight, the percentages being based upon the total weight of the composition.

The source of boron is preferably boric acid, although a large variety of other materials can be utilized. It is believed that the boric acid contributes to the formation of a uniform char by acting as a fluxing aid which assists in the formation of a homogeneous melt of materials during exposure to high temperatures or flames. Examples of suitable materials which can provide boron include boron oxide, borates such as sodium borate, potassium borate and ammonium borate, also borate esters such as butyl borates or phenyl borates. After boric acid, ammonium or sodium borate are next preferred. The claimed intumescent composition usually contains an amount of boron which ranges from about 0.1 to about 10 percent by weight, preferably 1 to 6 percent by weight, the percentages being based upon the total weight of the composition.

It should be understood that the phosphorus, zinc, boron, and expansion gas can each be provided by a separate source material or alternatively a single material may be a source of more than one of the aforelisted elements. For example, melamine pyrophosphate can provide a source of both phosphorus and expansion gas.

The reinforcing filler which is a preferred constituent of the additive component can be chosen from among a large array of conventionally utilized materials including fibrous reinforcements and platelet reinforcements which are preferred over other fillers. Examples of fibrous reinforcements include glass fibers, ceramic fibers, e.g., aluminum oxide/silicon oxide, and graphite fibers. Platelet reinforcements include hammer-mill glass flakes, mica, and wollastonite. Other suitable fillers include clay, talc, silica, and various pigments. Preferably, wollastonite is utilized. The reinforcing filler is believed to assist in controlling expansion of the fire protective composition prior to and during char formation so that the resultant char is hard and uniform. When present, the reinforcing filler is usually present in the composition in an amount ranging from about 1 to about 50 percent by weight, the percentages being based upon the total weight of the composition.

The fire protective intumescent composition of the present invention can be used as a one-package or two-package system. When it is used as a two-package system, the resinous composition is in one package, the curing agent is in a second package and the additive component is in either the resinous package or the curing agent package or in both packages. When the additive component is present in both packages the individual constituents can be in either package, as desired. The individual packages are mixed prior to use. When an epoxy resin is present in the resinous package and an amine curing agent is utilized, the packages are mixed such that the epoxy to amine equivalent ratio in the resultant composition is within the broad range set forth above.

In one embodiment of a single package system the intumescent composition of the present invention can be utilized with a blocked or latent curing agent such as, for example, the ketamine curing agents which have been mentioned above. The ketamine blocked curing agents cure as a result of exposure to moisture which causes hydrolysis of the ketamine and release of the free amine curing agent. Other latent curing agents can also be utilized such as those in which the free amine curing agent is liberated as a result of exposure to radiation.

The compositions of the present invention can also contain a variety of additives such as stabilizers, amino acids and proteins, rheology control agents, flame spread control agents, other fire retardant additives such as metal oxides, halogenated materials and phosphate esters and the like. These ingredients are, of course, optional and can be added in varying amounts.

In one embodiment the fire protective intumescent composition of the present invention is prepared in the form of a thick, paste-like material generally termed a mastic. The mastic can be applied by a variety of methods such as with a spray applicator or with a trowel. Preferably the claimed intumescent compositions are spray applied by air or airless spray application. Although thinning is not necessary, if desired, it can be accomplished with a variety of conventional solvents such as methylene chloride or 1,1,1-trichloroethane. Although many conventional solvents are suitable, preferably the solvent is nonflammable and of high volatility. The claimed compositions are especially useful for the protection of steel substrates although they can also be used to protect a variety of other substrates such as reinforced concrete, plastic, and wood.

The present invention also provides a method of reducing the rate of temperature rise in a material when it is subjected to fire conditions. In one embodiment the method comprises applying to the surface of a substrate a fire protective composition which, when exposed to fire conditions, intumesces. The intumescent composition has been described in detail above and will not be discussed further here. It is important to note that the intumescent composition is adapted to provide a carbonaceous char when exposed to fire conditions which retains its integral structure and adheres to the substrate without external reinforcement. The present invention also provides a substrate which demonstrates a reduced rate of temperature rise.

The fire protective, intumescent composition of the present invention provides excellent protection for structural steel members and other assemblies from the damaging effects of excessive heat and flames during a fire. The claimed compositions when burned produce a hard, small-celled char residue which can adhere to a substrate without external reinforcement and exhibits a minimum degree of cracking. The compositions afford excellent insulation to protect a variety of materials such as steel. The resinous composition prepared from the half-amide reaction product of a dioxalate and which is a principal constituent of the claimed intumescent compositions provides an added measure of expansion gas for char formation and results in a char with better insulating properties. Even if a fire never occurs, the compositions still afford excellent protection, as for example, from corrosion since the compositions resist water absorption and other damage brought about by climatic exposure.

The invention will be further described in connection with the examples which follow. These examples are given as illustrative of the invention and are not to be construed as limiting it to their details.

EXAMPLE I

| Charge | Ingredients | Parts by Weight (grams) |
| --- | --- | --- |
| I | diethyl oxalate | 730.0 |
| II | DIGLYCOLAMINE ®[1] | 525.0 |
| III | dibutyltin dilaurate | 1.6 |
|  | toluene diisocyanate | 261.0 |
| IV | ERL 4221[2] | 1286.0 |

[1]5-hydroxy-3-oxa-pentylamine commercially available from Jefferson Chemicals.
[2]3,4-epoxycyclohexylmethyl-
3,4-epoxycyclohexane carboxylate commercially available from Union Carbide.

A suitably equipped reactor vessel was charged with (I) and placed under nitrogen atmosphere. Charge (II) was then added over a two hour period while maintaining the temperature at about 28° C. After the addition was completed, the reaction mixture was held at about 28° C. for a two hour period. The reaction mixture was then heated to 120° C. and the distillate removed. Subsequently the mixture was sparged for 15 minutes at 120° C. Charge (III) was then added over a thirty minute period. The reaction was complete with the disappearance of isocyanate as determined by infrared spectroscopy. Charge (IV) was then added, and the mixture was allowed to cool to room temperature. The resultant product had a total solids content of 97 percent determined at 110° C. for one hour and a Gardner viscosity of Z7+.

EXAMPLE II

| Charge | Ingredients | Parts by Weight (grams) |
| --- | --- | --- |
| I | diethyl oxalate | 988.0 |
| II | DIGLYCOLAMINE ® | 710.5 |
| III | L2291 A[3] | 852.6 |
| IV | EPON 828[4] | 960.2 |

[3]This triisocyanate is commercially available from Mobay Chemical Corporation.
[4]This diglycidyl ether of bisphenol A is commercially available from Shell Chemical Company.

This preparation was performed in the manner detailed in Example I, above, with the exceptions that the sparge at 120° C. was for 30 minutes instead of 15 minutes and the reaction mixture was cooled to 90° C. prior to the addition of Charge (III), which was over a one hour period. Also, prior to adding the Charge (IV), the reaction mixture was cooled to 45° C. The resultant product had a total solids content of 97.4 percent determined at 110 ° C. for one hour.

EXAMPLE III

| Charge | Ingredients | Parts by Weight (grams) |
| --- | --- | --- |
| I | diethyl oxalate | 525.6 |

-continued

| Charge | Ingredients | Parts by Weight (grams) |
| --- | --- | --- |
| | CYMEL 300[5] | 311.3 |
| II | DIGLYCOLAMINE ® | 378.0 |
| III | para-toluenesulfonic acid | 16.5 |
| | methanol | 49.5 |

[5]This melamine-formaldehyde condensate is commercially available from American Cyanamid.

A suitably equipped reactor vessel was charged with (I) and placed under nitrogen atmosphere. Charge (II) was added over a one hour period while maintaining the temperature of 28° C. to 30° C. After the addition was completed, the reaction mixture was held at this temperature for one hour. Charge (III) was then added and the mixture was heated to 135° C. to 140° C. and the distillate removed. The resultant product had a total solids content of 88.2 percent determined at 110° C. for one hour.

EXAMPLE IV

This Example illustrates the preparation of a fire protective intumescent composition according to the invention.

| | Ingredients | Parts by Weight (grams) |
| --- | --- | --- |
| Package 1: | resinous composition of Example II above | 43.4 |
| | FYROL CEF[6] | 14.6 |
| | boric acid | 23.5 |
| | EXOLIT 422[7] | 5.1 |
| | zinc borate | 4.5 |
| | melamine | 3.0 |
| | wollastonite[8] | 14.4 |
| Package 2: | VCX 11-957[9] | 100.0 |

[6]Tris-(2-chloroethyl) phosphate commercially available from Stauffer Chemicals.
[7]Ammonium polyphosphate commercially available from American Hoechst.
[8]This fibrous reinforcing filler is commercially available from Nycor Corp. as NYAD D.
[9]This amine curing agent is commercially available from Henkel and has an average amine equivalent weight of 167.

The fire protective composition was prepared by mixing together 4 parts by weight of Package 1 and 1 part by weight of Package 2. The composition was applied to a 3 inch×3 inch×½ inch steel plate having one thermocouple embedded in it such that the top, bottom and sides were uniformly covered with a 3/10 inch thick coating. The plate was allowed to cure for two days at room temperature and then burned in a gas fired furnace according to ASTM E-119 (UL-263). The variable measured was the length of time required for the steel to reach a temperature of 1000° F. (538° C.). The test was concluded when the steel reached this temperature. [The temperature of the steel was measured by the thermocouple. When more than one thermocouple was utilized, the average of all the thermocouples was taken with the proviso that each individual thermocouple cannot exceed a temperature of 1200° F. (649° C.)].

The time required to reach the conclusion of the test was 49:44 (minutes:seconds). The control plate was identical to the coated plate in all respects except that it was not coated with the intumescent composition. The uncoated 3 inch×3 inch×½ inch steel plate required 12 minutes to reach a temperature of 1000° F. (538° C.).

EXAMPLE V

This Example illustrates the preparation of another fire protective intumescent composition according to the present invention.

| | Ingredients | Parts by Weight (grams) |
| --- | --- | --- |
| Package 1: | EPON 828 | 30.0 |
| | resinous composition of Example III, above | 95.3 |
| | FYROL CEF | 31.69 |
| | boric acid | 50.83 |
| | PHOS-CHEK-P-30[10] | 11.10 |
| | zinc borate | 9.74 |
| | wollastonite | 31.21 |
| Package 2: | VERSAMINE F20[11] | 65.28 |

[10]Ammonium polyphosphate having phosphorus content of 32 percent by weight. It is commercially available from Monsanto Corp.
[11]This amine curing agent is commercially available from Henkel and has an amine equivalent weight of 128.

The fire protective composition was prepared by mixing together 1.0 part by weight of Package 1 and 1.0 part by weight of Package 2. The composition was applied to a 3 inch×3 inch×½ inch steel plate having one thermocouple embedded in it. The composition was applied and tested as has been described above in Example IV. The coated steel plate required 39:44 to reach a temperature of 1000° F. (538° C.). The uncoated 3 inch×3 inch×½ inch steel control plate required 12 minutes to reach a temperature of 1000° F. (538° C.).

EXAMPLE VI

This Example illustrates the preparation and evaluation of yet another fire protective intumescent composition according to the present invention. The resinous composition utilized in this example is similar to that prepared in Example I, above.

| | Ingredients | Parts by Weight (grams) |
| --- | --- | --- |
| Package 1: | EPON 828 | 69.15 |
| | resinous composition[12] | 32.79 |
| | gelatin[13] | 27.60 |
| | FYROL CEF | 25.38 |
| | boric acid | 40.71 |
| | PHOS-CHEK-P-30 | 8.88 |
| | antimony oxide | 3.90 |
| | zinc borate | 3.90 |
| | wollastonite | 35.00 |
| Package 2: | VERSAMINE F20 | 50.67 |

[12]This resinous composition was prepared from diethyl oxalate, DIGLYCOLAMINE ® and toluene diisocyanate in the manner described above in Example I.
[13]This colloidal protein is commercially available from Knox Gelatin, Inc., as Knox Gelatin.

The fire protective intumescent composition was prepared by mixing together 1.0 part by weight of Package 1 and 1.0 part by weight of Package 2. The composition was applied to a 3 inch×3 inch×½ inch steel plate having one thermocouple embedded in it. The composition was applied and tested as has been described above in Example IV. The coated steel plate required 47:05 to reach a temperature of 1000° F. (538° C.). An uncoated 3 inch×3 inch×½ inch steel control plate required 12 minutes to reach a temperature of 1000° F. (538° C.).

EXAMPLE VII

This Example illustrates the preparation and evaluation of a fire protective intumescent composition of the present invention utilizing a mixture of curing agents.

| Ingredients | | Parts by Weight (grams) |
|---|---|---|
| Package 1: | resinous composition of Example II, above | 43.4 |
| | FYROL CEF | 14.6 |
| | boric acid | 23.5 |
| | EXOLIT 422 | 5.1 |
| | zinc borate | 4.5 |
| | Wollastonite | 14.4 |
| | melamine | 3.0 |
| Package 2: | VCX 11-957 | 70.0 |
| | VCX 11-980[14] | 19.04 |
| | IMSIL A-10[15] | 9.0 |

[14]This amine curing agent is commercially available from Henkel and has an average amine equivalent weight of 107.
[15]This filler is an amorphous silica commercially available from Illinois Minerals.

The fire protective intumescent composition was prepared by mixing together 3 parts by weight of Package 1 and 1 part by weight of Package 2. The composition was applied to a 3 inch×3 inch×¼ inch steel plate having one thermocouple embedded in it. The composition was applied and tested as has been described above in Example IV. The coated steel plate required 42 minutes to reach a temperature of 1000° F. (538° C.). An uncoated 3 inch×3 inch×¼ inch steel control plate required 12 minutes to reach a temperature of 1000° F. (538° C.).

EXAMPLE VIII

This Example illustrates the preparation of a further fire protective intumescent composition according to the present invention.

| Ingredients | | Parts by Weight (grams) |
|---|---|---|
| Package 1: | resinous composition of Example II, above | 43.4 |
| | EXOLIT 422 | 3.75 |
| Package 2: | VCX-11-957 | 25.0 |

The fire protective intumescent composition was prepared by combining 1.0 part by weight of Package 1 and 1.0 part by weight of Package 2. The composition was applied to a 9 inch×9 inch×¼ inch steel plate having two thermocouples embedded in it. The composition was applied and tested as has been described above in Example IV. The coated steel plate required 69 minutes to reach a temperature of 1000° F. (538° C.). An uncoated 9 inch×9 inch×¼ inch steel control plate required 13 minutes to reach a temperature of 1000° F. (538° C.).

EXAMPLE IX

This Example illustrates the preparation of a fire protective intumescent composition according to the present invention and its evaluation when applied to a wood substrate.

| Ingredients | | Parts by Weight (grams) |
|---|---|---|
| Package 1: | EPON 828 | 6.25 |
| | resinous composition[16] | 3.95 |
| | FYROL CEF | 2.54 |
| | chlorinated parafin | 1.84 |
| Package 2: | VERSAMINE F20 | 5.67 |

[16]This resinous composition was prepared in the manner described in Example I, above except that EPON 828 was used in place of ERL 4221.

An intumescent, clear coating composition was prepared by combining together 1.0 part by weight of Package 1 and 1.0 part by weight of Package 2. The composition was applied to a particle board substrate measuring 2 feet×6 inches×¼ inch. The coated board was evaluated according to ASTM E84 ("Tunnel Test"). The control board was prepared in the same way except that it was coated with a Class A, UL listed fire retardant pigmented coating composition commercially available from PPG Industries, Inc., under the registered trademark designation SPEEDHIDE® 42-7. The Flame Spread rating of the control composition was 10.83. The Flame Spread rating of the composition detailed above was 25.27. A class A rating for flame spread ranges from 0 to 25.

What is claimed is:

1. A resinous composition comprising the ungelled reaction product of:
   (i) a diester of oxalic acid;
   (ii) a material containing one or more primary and/or secondary amino groups and one or more additional functional groups; and
   (iii) a material capable of coreacting with (i) or (ii).

2. The resinous composition of claim 1 wherein the material capable of coreacting with (i) or (ii) contains functionality which is coreactive with the one or more functional groups of (ii).

3. A resinous composition comprising the ungelled reaction product of
   (a) an ungelled composition comprising the half-amide reaction product of a diester of oxalic acid and a material containing one or more primary and/or secondary amino groups and one or more different functional groups;
   (b) a material containing functional groups capable of coreacting with the ungelled composition of (a).

4. The resinous composition of claim 3 wherein the functional groups of the material of (b) are capable of coreacting with the different functional groups present on the amino group-containing material of (a).

5. The resinous composition of claim 3 wherein the diester of oxalic acid is selected from diethyl oxalate and dibutyl oxalate.

6. The resinous composition of claim 1 wherein the one or more additional functional groups present on the material containing primary and/or secondary amino groups are selected from the group consisting of hydroxyl, carboxyl, thiol, epoxy, alkoxysilane, tertiary amino, easily aminated ester, and vinyl unsaturation.

7. The resinous composition of claim 3 wherein the material containing primary and/or secondary amino groups is monomeric.

8. The resinous composition of claim 3 wherein the material containing primary and/or secondary amino groups is polymeric.

9. The resinous composition of claim 6 wherein the material containing primary and/or secondary amino groups contains an additional functional group which is hydroxyl.

10. A resinous composition comprising the ungelled reaction product of:
   (i) a diester of oxalic acid;
   (ii) 5-hydroxy-3-oxa-pentylamine; and
   (iii) a material capable of coreacting with (i) or (ii).

11. A resinous composition comprising the ungelled reaction product of:
   (a) an ungelled composition comprising the half-amide reaction product of a diester of oxalic acid and a material containing one or more primary and/or secondary amino groups and one or more different functional groups;
   (b) a polyisocyanate.

12. An intumescent, fire protective composition comprising a source of phosphorus and a resinous composition comprising the ungelled reaction product of
   (i) a diester of oxalic acid;
   (ii) a material containing one or more primary and/or secondary amino groups and one or more additional functional groups; and
   (iii) a material capable of coreacting with (i) or (ii); said intumescent fire protective composition being capable of forming a carbonaceous char upon exposure to heat or flame.

13. An intumescent, fire protective composition comprising a source of phosphorus and a resinous composition comprising the ungelled reaction product of
   (a) an ungelled composition comprising the half-amide reaction product of a diester of oxalic acid and a material containing one or more primary and/or secondary amino groups and one or more different functional groups;
   (b) a material containing functional groups capable of coreacting with the ungelled composition of (a); said intumescent fire protective composition being capable of forming a carbonaceous char upon exposure to heat or flame.

14. The composition of claim 13 wherein the functional groups of the material of (b) are capable of coreacting with the different functional groups present on the amino group containing material of (a).

15. The intumescent composition of claim 13 additionally comprising a curing agent adapted to cure the resinous composition.

16. The intumescent composition of claim 15 wherein the resinous composition additionally comprises one or more resinous materials different from the ungelled reaction product of components (a) and (b).

17. The intumescent composition of claim 16 wherein the additional resinous material is a polyepoxide.

18. The intumescent composition of claim 13 additionally comprising a source of boron.

19. The intumescent composition of claim 18 additionally comprising a source of zinc.

20. The intumescent composition of claim 19 additionally comprising a source of expansion gas upon thermal decomposition.

21. The intumescent composition of claim 20 additionally comprising a reinforcing filler.

22. An intumescent fire protective composition comprising
   I. a resinous composition comprising
      (a) the ungelled reaction product of
         (i) an ungelled composition comprising the half-amide reaction product of a diester of oxalic acid and a material containing one or more primary and/or secondary amino groups and one or more different functional groups, and
         (ii) a material containing functional groups capable of coreacting with the different functional groups present on the amino group containing material of (i);
      (b) an epoxy resin;
      (c) a curing agent adapted to cure the resinous composition of (I);
   II. an additive component, comprising a mixture of materials adapted to provide a source of phosphorous, zinc, boron, and an expansion gas upon thermal decomposition;
   said intumescent fire protective composition being capable of forming a carbonaceous char upon exposure to heat or flame.

23. The intumescent composition of claim 22 wherein the additive component additionally comprises a reinforcing filler.

24. The composition of claim 22 wherein the epoxy resin is an aromatic epoxy resin.

25. The composition of claim 24 wherein the aromatic epoxy resin is a polyglycidyl ether of a polyhydric aromatic alcohol.

26. The composition of claim 22 wherein the curing agent is a polyamine.

27. The composition of claim 22 wherein the material adapted to provide a source of zinc is selected from the group consisting of zinc oxide, zinc borate, and zinc phosphate.

28. The composition of claim 22 wherein the material adapted to provide a source of boron is selected from the group consisting of boric acid, ammonium borate, and sodium borate.

29. A method of reducing the rate of temperature rise in a substrate when it is subjected to fire conditions, which comprises applying to the surface of the substrate a fire protective composition which when exposed to fire conditions intumesces, characterized in that said fire protective composition comprises a source of phosphorus and a resinous composition comprising the ungelled reaction product of
   (a) an ungelled composition comprising the half-amide reaction product of a diester of oxalic acid and a material containing one or more primary and/or secondary amino groups and one or more different functional groups, and
   (b) a material containing functional groups capable of coreacting with the ungelled composition of (a); said intumescent fire protective composition being adapted to provide a carbonaceous char when exposed to fire conditions retaining its integral structure and adhering to the substrate without external reinforcement.

30. The method of claim 29 wherein the intumescent fire protective composition additionally comprises a curing agent adapted to cure the resinous composition.

31. The method of claim 30 wherein the intumescent fire protective composition additionally comprises one or more resinous materials different from the ungelled reaction product of components (a) and (b).

32. The method of claim 31 wherein the resinous material is an epoxy resin.

33. The method of claim 31 wherein the intumescent fire protective composition additionally comprises a mixture of materials adapted to provide a source of zinc, boron, and an expansion gas upon thermal decomposition.

34. A substrate which demonstrates a reduced rate of temperature rise when it is subjected to fire conditions, characterized by having applied on the substrate surface a fire protective composition which when exposed to fire conditions intumesces, said fire protective composition, comprising a source of phosphorus and a resinous composition comprising the ungelled reaction product of (a) an ungelled composition comprising the half-amide reaction product of a diester of oxalic acid and a material containing one or more primary and/or secondary amino groups and one or more different functional groups, and (b) a material containing functional groups capable of coreacting with the ungelled composition of (a);

said intumescent fire protective composition being adapted to provide a carbonaceous char when exposed to fire conditions retaining its integral structure and adhering to the substrate without external reinforcement.

* * * * *